Patented July 28, 1953

2,647,066

UNITED STATES PATENT OFFICE 2,647,066

PHOSPHOR SUSPENSION AND METHOD OF APPLYING

Horace H. Homer, Arlington, Mass., assignor to Sylvania Electric Products Inc., Salem, Mass., a corporation of Massachusetts No Drawing. Application March 1, 1950,
Serial No. 147,156

8 Claims. (Cl. 117—33.5)

This invention relates to methods and compositions for coating powdered phosphors onto a supporting medium such as the wall of a fluorescent lamp or the like.

The invention is especially useful with phosphors whose brightness of emission is affected deleteriously by oxidation.

A feature of the invention is the use of an easily-decomposable, non-oxidizing compound in the coating suspension with the phosphor. The compound must decompose easily with heat, passing into an essentially inert or reducing gaseous phase with no solid residue. Among such compounds are ammonium oxalate, oxalic acid and certain formates, although these are mentioned merely as examples and without limiting the generality of the preceding statement.

Other objects, features and advantages of the invention will be apparent from the following specification.

Fluorescent lamp bulbs are generally coated on their interior surface with phosphors. The phosphor may be suspended, for example, in a vehicle of ethyl cellulose and xylol, with a plasticizer, if necessary. Other vehicles customary in the art may be used, and the proportions of phosphor and vehicle, and of the ingredients of the vehicle adjusted in the usual manner to give the desired thickness of coating.

By my invention, I prepare a suspension of powdered ammonium oxalate, or other compound easily decomposable by heat to an entirely gaseous phase with no solid residue, and the phosphor. About 1 to 4 grams of the oxalate or other such material for each 100 grams of phosphor will generally be sufficient, the best amount being dependent on the baking procedure to which the coated bulb is to be subjected. I have found that although amounts greater than 4 grams per 100 grams of phosphor may be used, additions in excess of 4 grams give a rough appearing coating, which is generally undesirable.

The suspension, with the addition of the easily-decomposable compound as above, is applied to the lamp tube by methods usual in the art, the coating then dried and afterward baked, at say 500° C., to eliminate the cellulose. The latter is generally first converted to carbon by the heating, and the carbon then oxidized away in the presence of air.

This presence of air during heating appears to reduce the fluorescent brightness of many phosphors, particularly those of the halo-phosphate series, such as calcium halophosphate. The oxalate decomposes to ammonia, the oxides of carbon, and water vapor, which apparently form a protective atmosphere around the phosphor particles without similarly protecting the cellulose or other binder which is to be removed by oxidation. It may be that the oxalate protects the phosphor during the first stage of the baking process, while the cellulose binder is being converted to carbon, and may be gone by the time the second stage is reached, when the carbon itself is being oxidized away.

As an example of the efficacy of my invention, a test showed that the inclusion of ammonium oxalate in the coating suspension of a white-fluorescing calcium halophosphate phosphor increased the light output efficiency of the resultant fluorescent lamp by 4 lumens per watt, or about 7%. Various percentages of oxalate by weight gave the following results in a forty-watt, 3500° white, fluorescent lamp, for example:

| Percent Oxalate | Lumens Per Watt |
|---|---|
| 0 | 54.4 |
| 1 | 54.7 |
| 2 | 55.9 |
| 4 | 58.4 |

The lumens per watt were taken after the lamps had operated for 100 hours, to conform to the standard rating practice for light output of fluorescent lamps.

What I claim is:

1. A suspension for applying to fluorescent lamps a phosphor deleteriously affected by oxidation during baking of said lamps but immersed in a cellulosic binder which is to be removed by oxidation, comprising a suspending vehicle, a cellulosic binder capable of being removed by oxidation, a phosphor deleteriously affected by oxidation, and a material selected from the group consisting of ammonium oxalate and oxalic acid.

2. The process of coating an object with a phosphor deleteriously affected by oxidation, which method comprises the steps of: mixing a suspension of said phosphor, a cellulosic binder which is to be removed by oxidation, an organic solvent for said binder, and a few percent by weight of a compound selected from the group consisting of ammonium oxalate and oxalic acid; applying the resultant suspension to the object; and baking the object in air to eliminate said binder by oxidation.

3. The process of coating a lamp envelope with a phosphor deleteriously affected by oxidation, which process includes the steps of adding said phosphor and a small quantity of a compound selected from the group consisting of ammonium oxalate and oxalic acid to a suspending vehicle, containing a cellulosic binder, applying the resultant suspension to the envelope, and then baking the envelope in the presence of air.

4. A coating suspension for fluorescent lamps, comprising a cellulosic binder, a vehicle for said binder, a phosphor affected deleteriously by oxidation, and a small quantity of a compound selected from the group consisting of ammonium oxalate and oxalic acid.

5. The process of coating an object with a phosphor affected deleteriously by oxidation, which process includes the steps of adding to a suspending vehicle including a cellulosic binder, the phosphor and a compound selected from the group consisting of ammonium oxalate and oxalic acid, applying the resultant suspension to the object, and baking the object.

6. The process of coating a lamp tube with phosphor affected deleteriously by oxidation, which includes the steps of adding ammonium oxalate to the suspending vehicle containing a cellulosic binder, applying the resultant suspension to the envelope, drying, and then baking the envelope in the presence of air to remove the binder and oxalate.

7. A coating suspension for fluorescent lamps, comprising a cellulosic binder, a vehicle for said binder, a phosphor deleteriously affected by oxidation, and a small quantity of ammonium oxalate.

8. A coating suspension for fluorescent lamps, comprising a cellulosic binder, a vehicle for the binder, a phosphor affected deleteriously by oxidation, and about 4% ammonium oxalate by weight of phosphor.

HORACE H. HOMER.

References Cited in the file of this patent

UNITED STATES PATENTS

| Number | Name | Date |
|---|---|---|
| 2,311,513 | Bell et al. | Feb. 16, 1943 |
| 2,331,306 | Casellini | Oct. 12, 1943 |
| 2,405,031 | Goodman | July 30, 1946 |
| 2,458,286 | Miller | Jan. 4, 1949 |

FOREIGN PATENTS

| Number | Country | Date |
|---|---|---|
| 642,846 | Germany | Mar. 4, 1937 |